Aug. 13, 1946. R. A. SCHAFER 2,405,718
MACHINE TOOL
Filed May 5, 1944 8 Sheets-Sheet 3

Aug. 13, 1946.　　　R. A. SCHAFER　　　2,405,718
MACHINE TOOL
Filed May 5, 1944　　　8 Sheets-Sheet 4
Fig. 4.
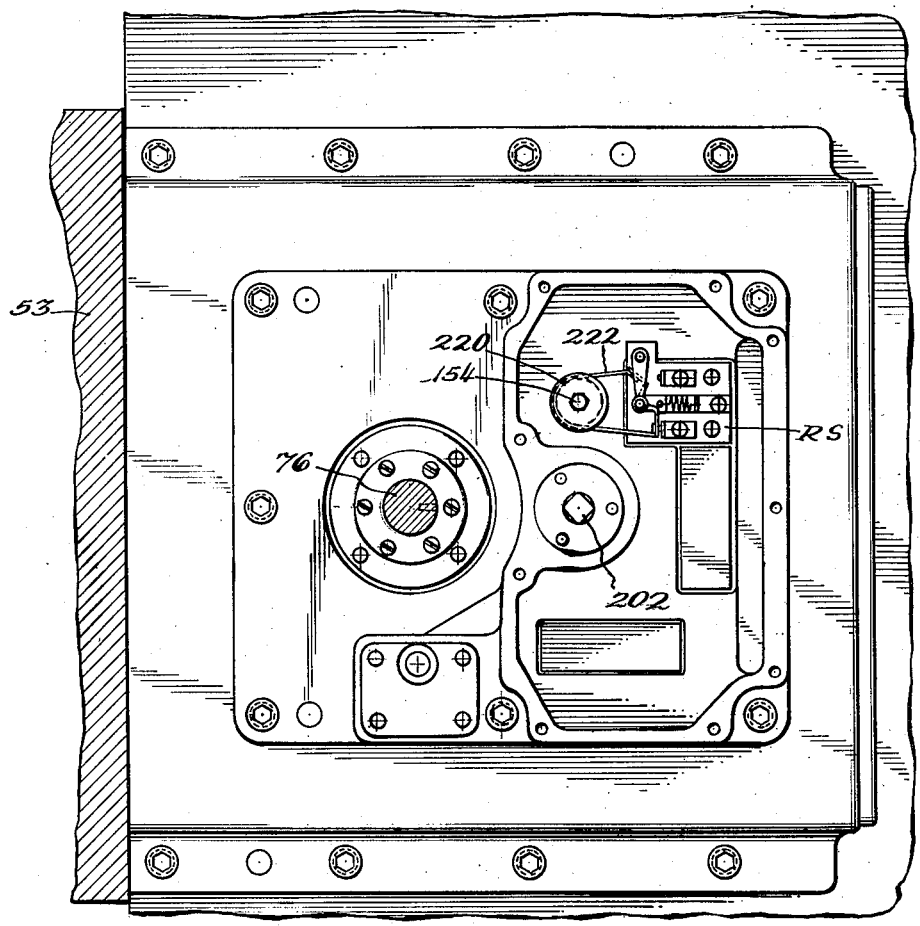
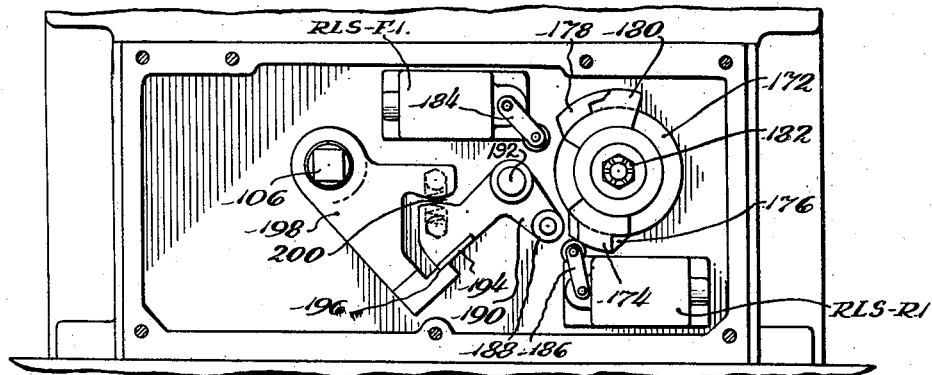
Fig. 6.
Inventor:
Robert A. Schafer
By Williams, Bradbury & Hinkle
attorneys

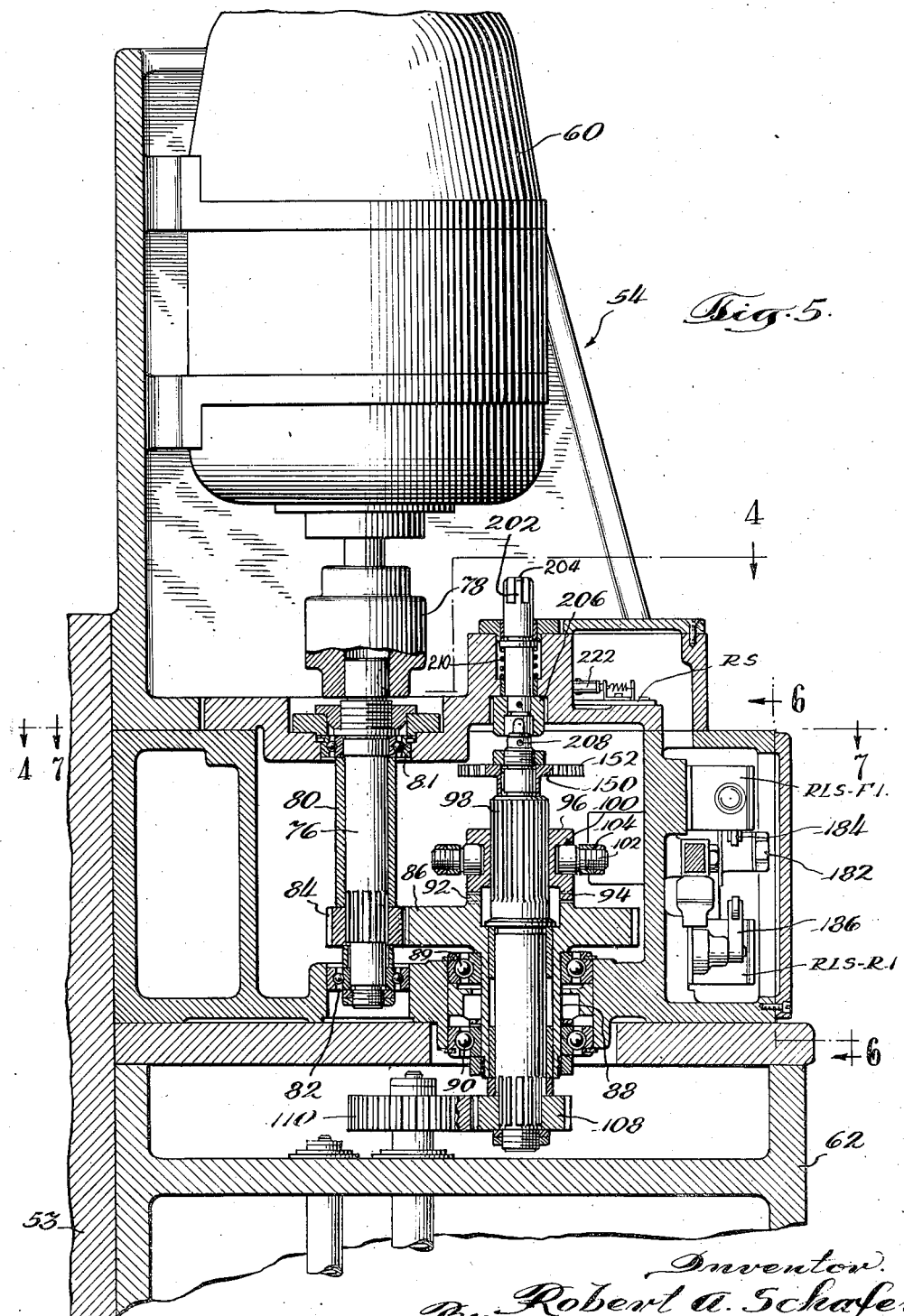

Aug. 13, 1946.  R. A. SCHAFER  2,405,718
MACHINE TOOL
Filed May 5, 1944  8 Sheets-Sheet 6

Inventor.
Robert A. Schafer.
By Williams, Bradbury & Hinkle
Attorneys

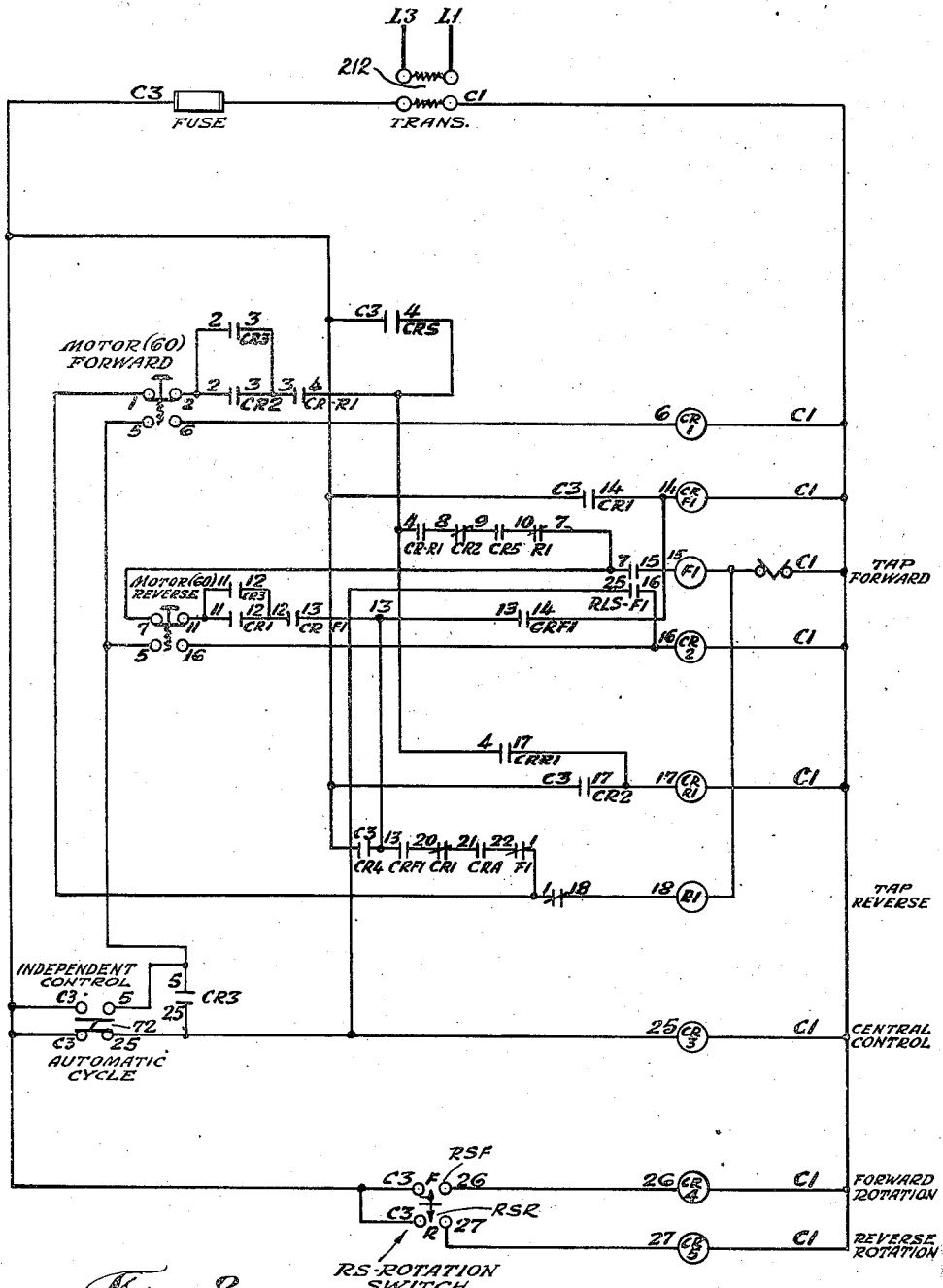

Aug. 13, 1946.  R. A. SCHAFER  2,405,718
MACHINE TOOL
Filed May 5, 1944  8 Sheets-Sheet 8
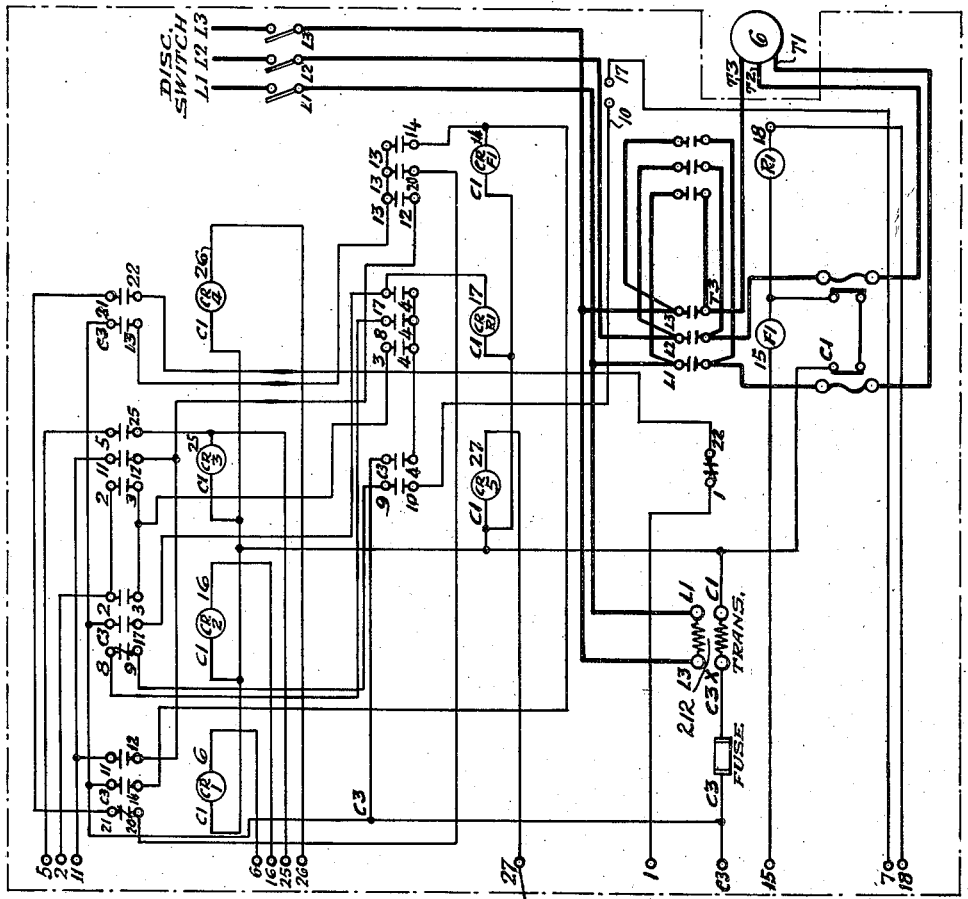

Patented Aug. 13, 1946

2,405,718

UNITED STATES PATENT OFFICE 2,405,718

MACHINE TOOL

Robert A. Schafer, Richmond, Ind., assignor to National Automatic Tool Company, Inc., Richmond, Ind., a corporation of Indiana Application May 5, 1944, Serial No. 534,220

11 Claims. (Cl. 10—129)

My invention relates generally to machine tools, and more particularly to improved mechanical and electrical control means for machine tools used for tapping operations.

It has been common practice to provide machine tools with suitable controls for causing a spindle driving motor to reverse at the end of a forward portion tapping cycle and to stop after the tap has been withdrawn from the work. Such machines have usually included a rotary limit switch, geared to the tap carrying spindle, which could be set to cause reversal of the spindle driving motor and application of a brake thereto upon completion of a predetermined number of revolutions of the spindle, and to cause the motor to stop after it had driven the spindle in the reverse direction an equal number of revolutions.

Due to the momentum, particularly of the rotating parts of the motor, such limit switch necessarily had to operate with a high degree of precision and reliability, to prevent tapping to a greater depth than desired. Since in many pieces of work the tapping operation required that the tap substantially bottom in the hole, slight overrunning of the tap often resulted in breaking the tap or damaging the work. Under ordinary circumstances such limit switch controlled tapping machines would operate properly, but occasionally, after some use, either the limit switch or the solenoid brake on the motor failed to operate properly, and the resulting undesirable overrunning of the tap occurred sufficiently frequently to render this type of control not entirely satisfactory.

Various other expedients, such as mechanically operated snap-acting clutches, have similarly been found subject to failure, resulting in overrunning of the taps.

It is therefore an object of my invention to provide a tapping machine with improved safety means for controlling the operation of the spindle driving motor, which is positive in operation, and which will preclude over-running of the taps.

A further object is to provide an improved machine tool for performing tapping operations, in which the operation of the spindle driving motor is electrically controlled, and in which safety mechanical clutch means are provided to prevent over-running of the tap carrying spindles in the event of failure of the electrical reversing system, or failure of the solenoid operated brake on the motor.

A further object is to provide an improved control means for a machine tool used in the performance of tapping operations.

A further object is to provide a machine tool for the performance of tapping operations, with improved combined electrical and mechanical spindle driving motor control means.

Other objects will appear from the following description, reference being had to the accompanying drawings, in which:

Fig. 4 is a transverse sectional view, taken on the line 4—4 of Fig. 5, with the rotation switch cover plate removed;

Fig. 5 is a fragmentary vertical sectional view showing the safety clutch and a portion of the spindle drive gearing, and taken on the line 5—5 of Fig. 7;

Fig. 6 is a side elevational view of the limit switch and clutch operating mechanism, taken on the line 6—6 of Fig. 5;

Fig. 8 is a simplified schematic wiring diagram of the electrical control circuits; and Fig. 9 is a schematic wiring diagram of the electrical control and power circuits.

General description

Figure 1:
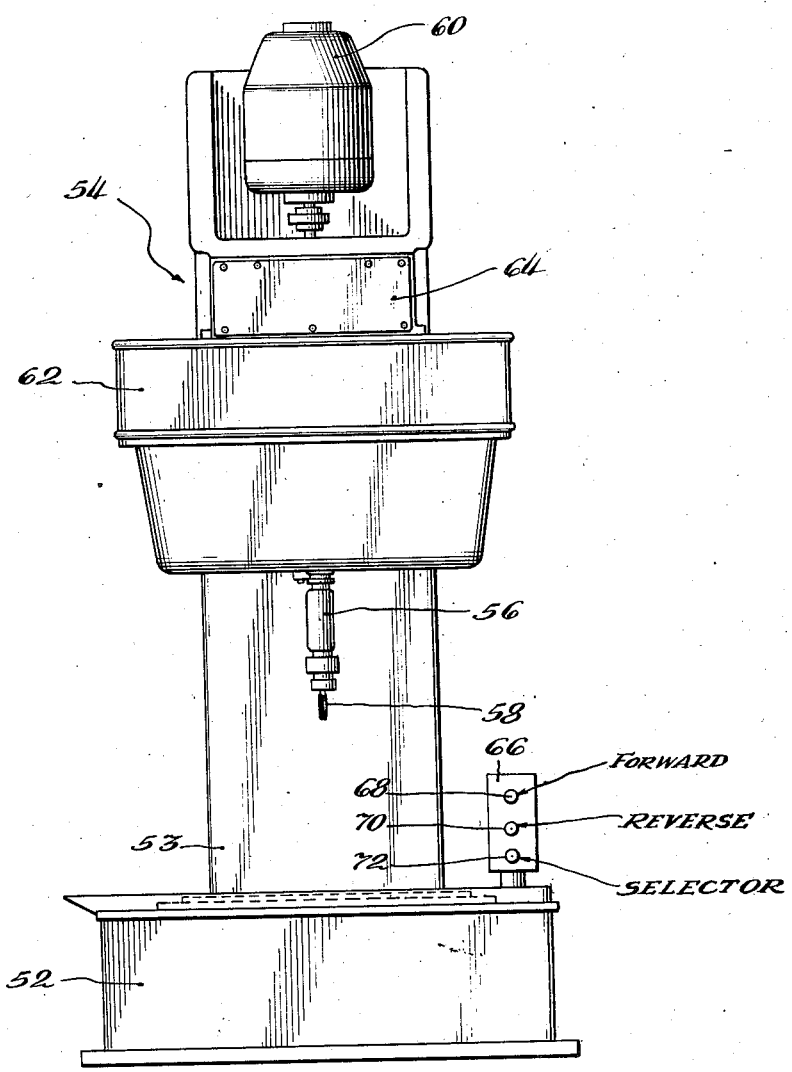
Fig. 1 is a front elevational view of the machine tool.
Figure 2:
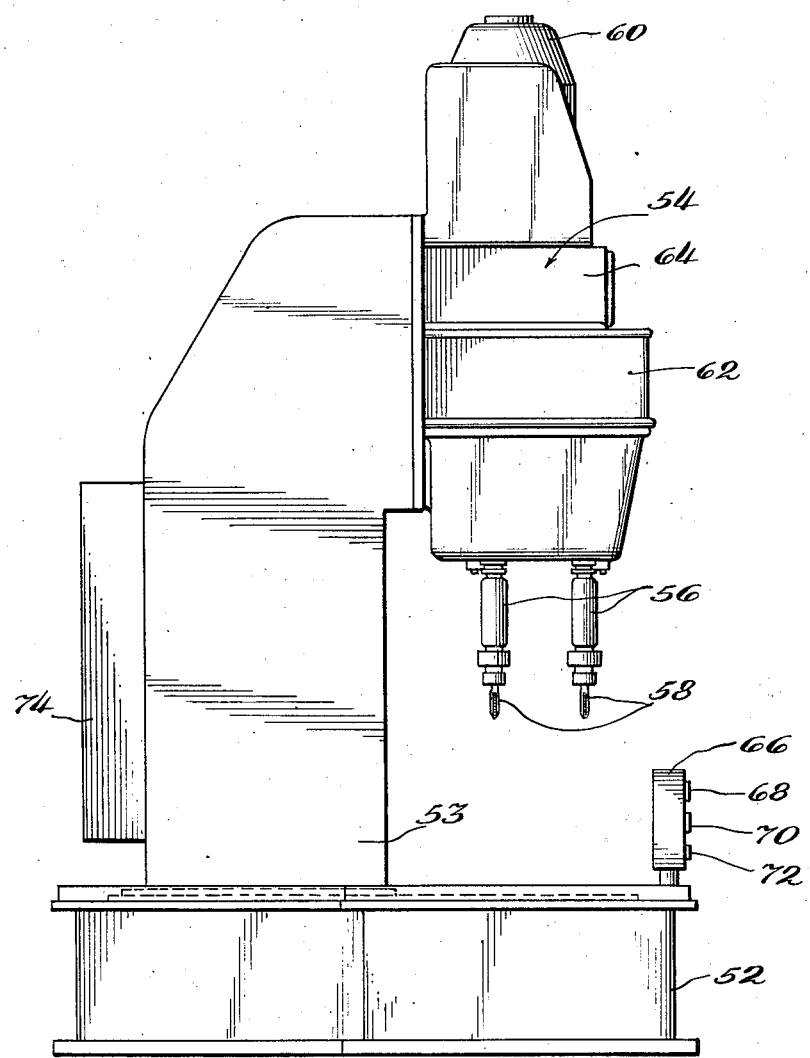
Fig. 2 is a left side elevational view thereof.

The invention is illustrated as embodied in a machine tool comprising a base 52 (Figs. 1 and 2), a vertical column 53, and a tapping unit head 54 adjustably secured to the column 53. The tapping unit comprises one or more spindles 56 carrying taps 58 and driven by a motor 60 through gearing contained in a gear box 62, and through a clutch mechanism contained in a casing 64. Suitably mounted on the base 52 is a push button panel 66 having a forward push button 68, a reverse push button 70, and a selector push button 72. Suitably mounted at the rear of the vertical column 53 is a cabinet 74 containing various relays and electrical control circuit elements.

As best shown in Fig. 5, the driving shaft of the motor 60 is connected to a shaft extension 76 by a coupling 78, the shaft 76 being surrounded by a spacing sleeve 80 and mounted for rotation in anti-friction bearing assemblies 81 and 82. The shaft extension 76 is splined to receive a pinion 84 which meshes with a gear 86. The gear 86 is formed integrally with a hub sleeve 88 mounted for rotation in anti-friction bearing assemblies 89 and 90. The gear 86 has jaws 92 formed on its upper hub for engagement with complementary jaws 94 formed on a clutch member 96, the member 96 being suitably splined or keyed to a shaft 98 so as to be longitudinally slidable thereon. The clutch member 96 is provided with an annular groove 100 to receive a pair of roller carrying pins 102 secured to a clutch operating yoke 104 (Fig. 7), the latter being secured to a shaft 106.

Figure 3:
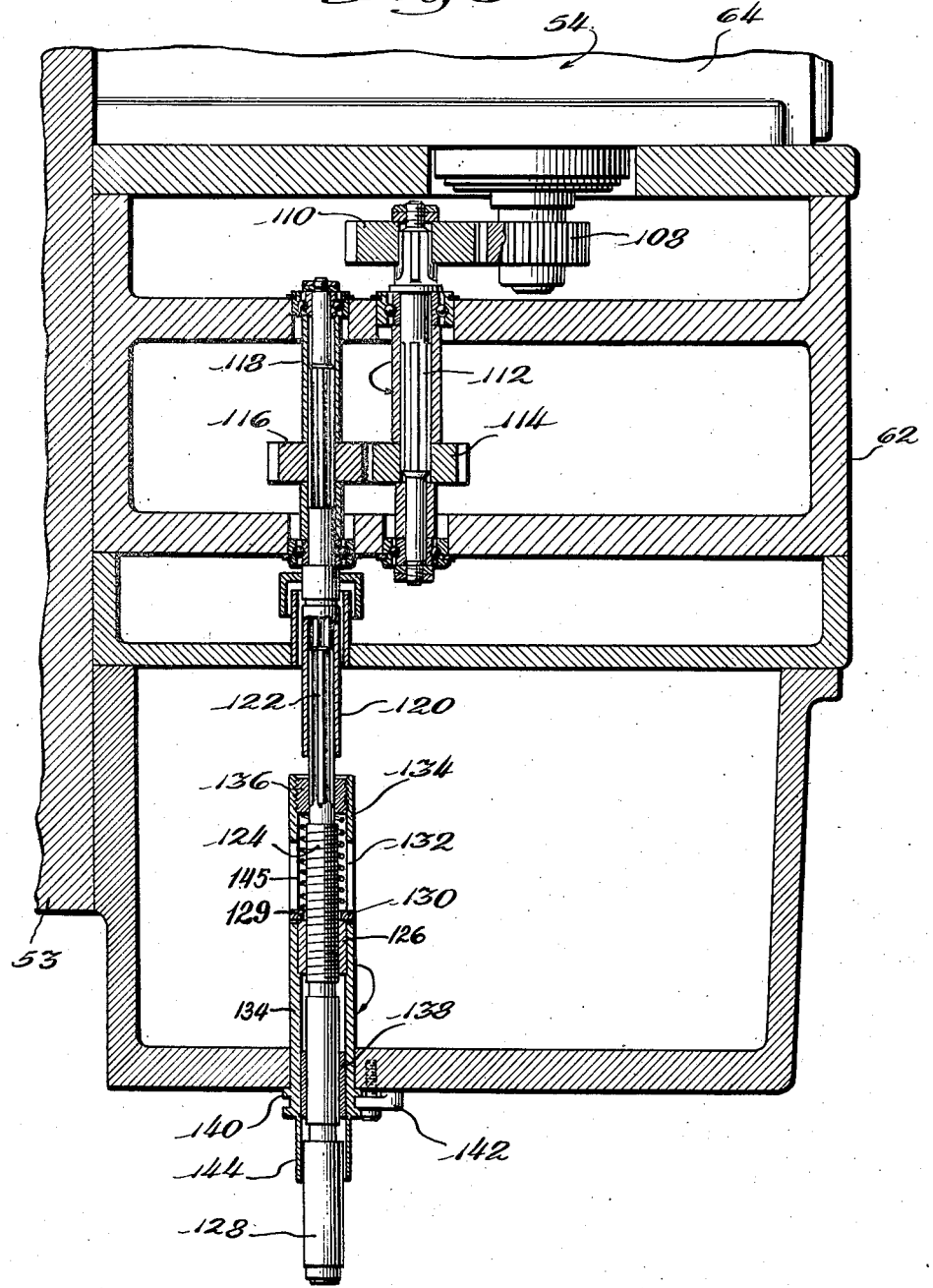
Fig. 3 is an enlarged fragmentary vertical sectional view showing the spindle drive gearing.

Suitably splined to the lower end of the shaft 98 is a main drive pinion 108 (Fig. 5). As best shown in Fig. 3, the pinion 108 meshes with a gear 110 carried by a countershaft 112 suitably mounted for rotation in the gear box 62. A pinion 114 secured to the shaft 112 meshes with gears 116, each non-rotatably secured to a spindle drive shaft 118. The spindle drive shafts 118 are suitably mounted in bearings formed in the gear box 62. Each of the spindle shafts 118 has a slip coupling member 120 formed at the lower end thereof to receive the splined end 122 of a lead screw 124. The lead screw 124 is threaded in a lead screw nut 126 and may be formed integrally with the tool receiving spindle 128. Resting upon the nut 126, and non-rotatably interlocked therewith, is a washer 129 having sidewardly extending lugs 130 which are guided in slots 132 formed in a spindle sleeve 134. The nut 126 is not rotatable in the sleeve 134, but is capable of limited movement longitudinally thereof. Suitable bearing bushings 136 and 138 are secured in the sleeve 134 for rotatably supporting the spindle. The sleeve 134 has an annularly grooved enlarged lower end portion 140 which is detachably secured against the lower end of the spindle box by means of a suitable clamp 142. The sleeve 134 may be provided with a depending oil guard skirt portion 144.

Thus, as the spindle shaft 118 rotates, the lead screw 124 feeds downwardly through the nut 126 and advances the tap into the work. In the event that, prior to entering the hole to be tapped, the tap meets an obstruction preventing its downward movement (as might be the case if, due to some error, the workpiece was not properly drilled for the hole to be tapped), the nut 126 may travel upwardly on the lead screw against the force applied by a spring 145, and thus prevent breakage of the tap. The coil spring 145 is compressed between the bushing 136 and the washer 129 resting upon the upper end of the nut 126, and maintains sufficient downward pressure on the tap to cause it to engage and feed into the work. Upon reverse rotation of the spindle shaft 122, the lead screw will feed upwardly through the nut 126, and thus when the tap has been completely withdrawn from the work, the nut will have returned to the position in which it is shown in Fig. 3.

Clutch disengaging mechanism

Figure 7:
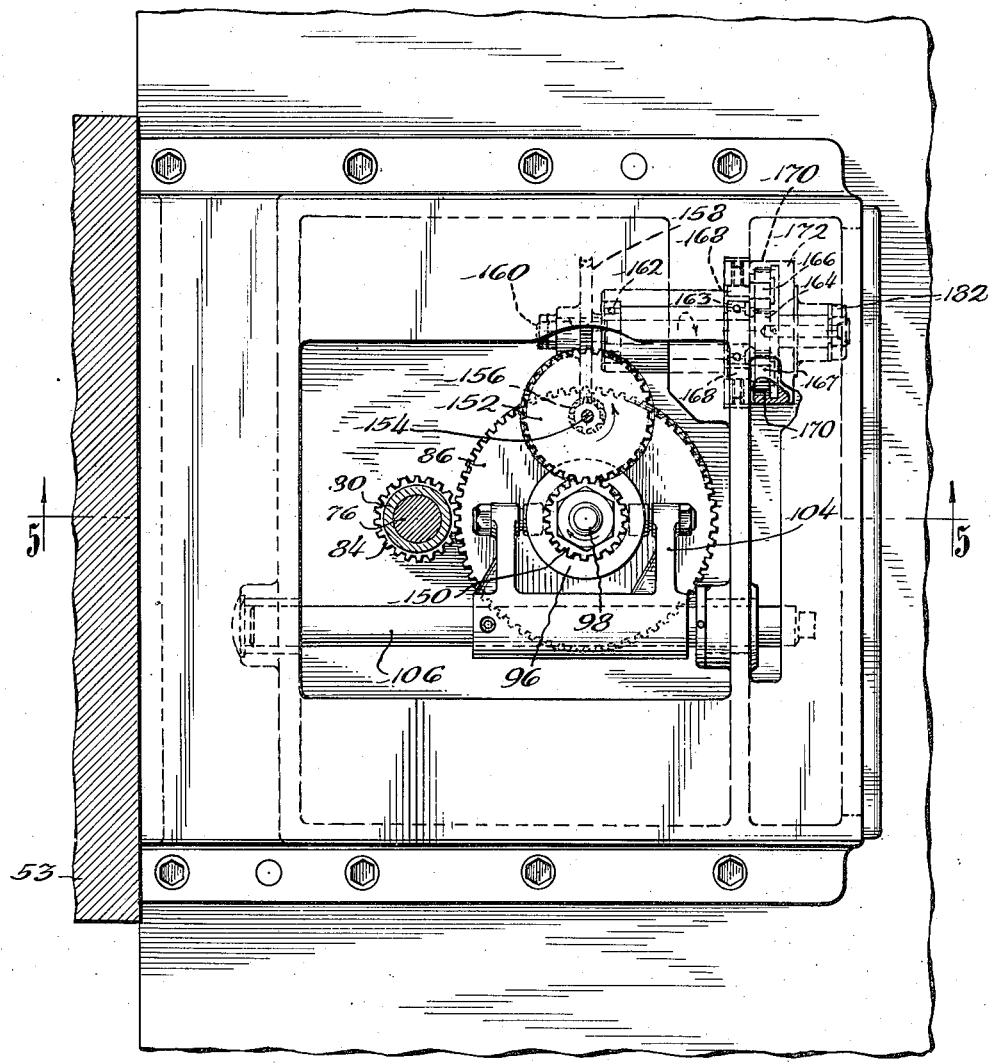
Fig. 7 is a fragmentary transverse sectional view, taken on the line 7—7 of Fig. 5.

A pinion 150 (Figs. 5 and 7) is non-rotatably secured to the shaft 98 and meshes with a gear 152 secured to a shaft 154. The shaft 154 carries a worm 156 meshing with a worm gear 158. The worm gear 158 is secured to a shaft 160 mounted in suitable anti-friction bearings 162, 163, and having a gear 164 at its right-hand end (Fig. 7). The gear 164 meshes with a pair of idler pinions 166, 167, which are mounted for free rotation on stationary pins 168, the idler pinions 166, 167 meshing with an internal gear 170 formed integrally with a cam disc 172.

As best shown in Fig. 6, a stop cam 174, a clutch disengaging cam 176, a clutch over-travel cam 178, and a reverse cam 180 are adjustably secured to the cam disc 172, being non-rotatably clamped thereto by means of a nut 182. The cam 180 is adapted to engage a roller on the actuating arm 184 of a reverse limit switch RLS—F1, while the cam 174 is adapted to engage the roller on the end of the actuating arm 186 of a rotary limit or stop switch RLS—R1.

The cams 176 and 178 are in alignment with a roller 188 carried by a clutch latch bellcrank 190. The latch 190 is pivoted on a stud 192 and has a portion 194 engageable in a notch 196 formed in a bifurcated clutch lever 198. The portion 194 of the clutch latch is held in engagement in the notch 196 of the clutch lever by a compression coil spring 200 mounted in suitable sockets formed in the latch 190, and in the upper arm of the clutch lever 198. The clutch lever 198 is non-rotatably secured to the shaft 106 to which, it will be recalled, the clutch operating yoke 104 is secured. Thus, counterclockwise movement (Fig. 6) of the clutch lever 198 will cause disengagement of the jaw clutch 92, 94, and thereby disengage the gear 86 from the shaft 98, and interrupt the drive to the spindles.

When the spindles are being driven in the forward direction, the clutch disc 172 (Fig. 6) rotates counterclockwise and such rotation will continue until the cam 180 engages the roller on the operating arm 184 of the reverse limit switch RLS—F1, whereupon, as will hereinafter appear, the connections to the motor 60 will be changed to cause it to reverse its direction of rotation. If, however, the switch RLS—F1 fails to operate, the continued counterclockwise movement of the cam disc 172 will cause the cam 178 to engage the roller 188 of the clutch latch 190 and swing the latter clockwise to disengage its latch portion 194 from the notch 196. Due to the action of the spring 200, the clutch lever 198 will thus be swung counterclockwise, and thereby raise the yoke pins 102 (Fig. 5) and disengage the jaw clutch member 96 from the jaws 92 on the hub of the gear 86. If the spring 200 is not sufficiently powerful to cause such clutch disengagement, the adjacent portion of the clutch latch 190 will engage the upper arm of the clutch lever 198 and forcibly disengage the clutch.

In a similar manner, upon completion of the required number of reverse revolutions of the taps, the stop cam 174 will engage the roller on the actuating arm 186 of the rotary limit switch RLS—R1 to cause deenergization of the spindle driving motor 60. If, however, through some failure of the switch RLS—R1, or through failure of the plugging circuit to operate properly, the motor continues to coast to an undesirable extent, the cam 176 will engage the roller 188 and thereby swing the clutch latch 190 clockwise to cause the latch portion 194 thereof to be removed from the notch 196 and thus effect counterclockwise swinging movement of the bifurcated clutch lever 198 to cause disengagement of the clutch 92, 94, and thereby disconnect the driving motor 60 from the tap carrying spindles. Since the momentum of the spindles is relatively slight compared to the frictional torque load retarding movement thereof, the spindles will promptly come to rest, while the motor 60 may continue to coast harmlessly.

If the operator finds that the motor continues running after the jaw clutch 92, 94 is disengaged, it will indicate that the reverse limit switch RLS—F1 has failed to operate and requires repair or replacement. Similarly, if the motor fails to stop after completion of the return portion of the cycle, it will indicate to the operator that the stop switch RLS—R1 has failed to operate and correction of this condition is required.

After an occurrence of disengagement of the jaw clutch 92, 94, the operator will be required to reposition the clutch latch, clutch lever, and jaw clutch members in latching and clutch engaging position. To accomplish this, there is provided a stub shaft 202 having a squared end portion 204 for engagement by a suitable crank-like tool. The shaft 202 has a notched coupling element 206 at its lower end, the notches thereof being engageable with the ends of a pin 208 which extends diametrically through the upper end of the shaft 98. The shaft 202 is normally held in its upper position by a compression coil spring 210 with the coupling 206 free from the pin 208. When it is necessary to reset the clutch latching elements, the operator applies a crank to the upper end of the shaft 202 and presses the shaft downwardly to cause engagement of the coupling member 206 with the pin 208, and then rotates the shaft 98 in such direction as will cause the cam members 174, 176, 178, and 180 to be rotated to their normal positions, such as shown, for example, in Fig. 6.

When the cams 174, 176, 178, and 180 have thus been rotated to normal position, a suitable crank or wrench is applied to the squared end of shaft 106. By rotating shaft 106 clockwise (Fig. 6), the clutch member 96 will be moved downwardly to reengage its jaws 94 with jaws 92, and the clutch operating lever 198 will be swung clockwise against the force of the spring 200 until the plate 194 of the latch 190 reengages in the notch 196. It will be apparent that in order to reengage the clutch in this manner, the movement of the roller 188 must not be impeded by either the cam 176 or cam 178.

A pulley 220 is non-rotatably secured to the upper end of the worm shaft 154 and is provided with a belt 222 for the operation of a rotation plugging switch RS, this switch being of conventional construction and operating to close switch contacts RSF (Figs. 8 and 9) when the spindle is being driven in a forward direction, and to close switch contacts RSR when the spindle is being driven in a reverse direction. This switch mechanism operates promptly after any change in the direction of rotation of the shaft 98, since the belt 222 is in firm frictional engagement with the pulley 220 and the switch mechanism has but little lost motion.

*Control circuits*

The control circuits for the machine are illustrated in simplified form in Fig. 8, and in more complete form in Fig. 9. Referring to these figures, a transformer 212 has its primary winding connected to line conductors L1 and L3, and its secondary winding being connected to control conductors C1 and C3. When the machine is to be manually controlled, the push button operated selector switch 72 is in its upper position, connecting conductor C3 to conductor 5. The motor 60 may then be jogged in a forward or reverse direction by pressing the push button 68 or the push button 70.

When the push button 68 is operated, the conductor 5 is connected to the conductor 6 and thereby completes a circuit through the winding of control relay CR1 to the return conductor C1. Energization of relay CR1 operates the contacts bearing the reference character CR1. Closure of the CR1 contact between conductor C3 and conductor 14 results in energization of CRF1.

The relay CRF1 is locked as soon as the motor starts forward, by means of rotation switch RS, which completes a circuit from conductor C3, switch RSF, conductor 26, and winding of CR4 to conductor C1. Energization of CR4 results in closure of the CR4 contacts between conductors C3 and C13. Since the CRF1 contacts between conductors 13 and 14 are closed, a locking circuit is thus established for the winding of CRF1.

Energization of relay CR1 also closes the CR1 contacts between conductors 11 and 12, and energization of CRF1 closes its contacts between conductors 12 and 13. A circuit through the relay F1 is thus completed, this circuit being traced as follows: Conductor C3, CR1 contacts, conductor 14, CRF1 contacts, conductor 13, CRF1 contacts, conductor 12, CR1 contacts, conductor 11, reverse push button switch 70, conductor 7, RLS—F1 contacts, conductor 15, winding F1, to conductor C1.

Energization of F1 results in starting the motor 60 in a forward direction. The motor will run in a forward direction until the forward push button 68 is released, thus deenergizing CR1, or until the limit switch RLS—F1 opens the contacts between conductors 7 and 15 at the forward limit. Opening the latter contacts, or deenergizing the relay CR1 will, of course, result in deenergization of F1 and thus interrupt the current supply to the motor 60.

Control relay CR4 remains energized as long as the motor 60 continues to rotate or coast forward, thus maintaining the holding circuit for CRF1 until forward rotation of the motor ceases.

When relay F1 is deenergized, it closes its contacts between conductors 22 and 1. Thus a circuit R1 is completed from the conductor C3, contacts of CR4, conductor 13, closed contacts of CRF1, conductor 20, closed contacts of CR1, conductor 21, closed contacts of CR4, conductor 22, closed contacts of F1, conductor 1, closed contacts of RLS—R1, conductor 18, and winding arm of R1, to conductor C1.

Energization of R1 results in applying power to the motor 60 to cause it to rotate in the reverse direction. This application of reverse torque to the motor causes it to stop quickly and commence rotating in the reverse direction. As soon as the motor starts rotating in the reverse direction, it opens the rotation switch contacts RSF, and closes contacts RSR, thus deenergizing CR4 and energizing CR5. Deenergization of CR4 opens its contacts between conductors 21 and 22, which opens the previously described energizing circuit for R1. This will occur promptly after the reversal of the motor. The motor will stop rather promptly due to friction, the extent of reverse rotation depending upon the length of time it takes CR4 to open and upon the amount of friction in the machine.

To cause the motor to operate in the reverse direction, the reverse push button 70 is depressed and this results in reverse rotation of the motor in a manner similar to that described above with reference to forward rotation.

More specifically, operation of the reverse push button 70 completes a circuit from the conductor C3 through the selector switch 72 (the latter being in its upper position, Fig. 8), conductor 5, reverse switch 70, conductor 16, to energize relay CR2. Thus the contacts CR2 between conductors C3 and 17 are closed, and relay CRR1 is energized. The contacts CRR1 between conductors 4 and 17 are thus closed, and a circuit for energization of the relay R1 is completed as follows: From conductor C3, contacts CR2, conductor 17, contacts CRR1, conductor 4, contacts CRR1, conductor 3, contacts CR2, conductor 2, push button switch 68 (in its upper position), conductor 1, contacts RLS—R1, and winding of relay R1 to conductor C1.

Energization of relay R1 causes operation of the contacts shown above it in Fig. 9, thereby changing the connections to the motor 60 to cause it to rotate in the reverse direction. As soon as such reverse rotation has commenced, the rotation switch contacts RSR are closed, and relay CR5 thereby energized, establishing a connection between conductors C3 and 4. The motor will therefore continue rotating in the reverse direction until the push button 70 is released, or the rotary limit switch RLS—R1 is opened due to the return of the taps to their starting or normal position. Such opening of the RLS—R1 contacts between conductors 1 and 18 deenergizes relay R1 and temporarily energizes relay F1 through a circuit traced as follows: conductor C3, contacts CR2, conductor 17, contacts CRR1, conductor 4, contacts CRR1, conductor 8, contacts CR2, conductor 9, contacts CR5, conductor 10, contacts R1, conductor 7, upper contacts of RLS—F1, and relay F1 to conductor C1. The relay F1 will operate the motor control contacts so as to connect the motor 60 to the line conductors L1, L2, and L3, in a manner to cause forward rotation of the motor. The application of current to the motor in the forward direction applies a braking or plugging torque to the motor so that it stops its reverse rotation rapidly and commences rotating forwardly. Upon initial forward movement of the motor, the rotation switch contacts RSR will be opened, thus deenergizing CR5 and opening the contacts CR5 between conductors 9 and 10, thereby deenergizing relay F1 and bringing the motor to a stop.

It will be understood that the tapping head unit 54 may form part of a single head machine either of the vertical or horizontal type, or may be at any desired angle relative to the vertical, and that it may form part of a multiple unit machine simultaneously or successively performing a multiplicity of machine operations upon the work. In such multi-unit machines particularly, it is desirable to provide for automatic tapping cycles. In the machine illustrated, this is accomplished by operating the selector push button 72 to its automatic cycle position, that is, closing the switch between conductors C3 and 25. Closure of this switch results in energization of CR3. The automatic cycle is started by pressing the forward push button 68, thereby energizing CR1 through the following circuit: conductor C3, selector switch 72, conductor 25, contacts CR3, conductor 5, push button switch 68, conductor 6, CR1, to conductor C1.

Energization of CR1 completes a circuit to energize CRF1 as follows: conductor C3, contacts CR1, conductor 14, CRF1, and C1. Energization of CRF1 completes a circuit to energize F1 as follows: conductor C3, contacts CR1, conductor 14, contacts CRF1, conductor 13, contacts CRF1, conductor 12, contacts CR1, conductor 11, contacts of reverse switch 78 (in its upper position), conductor 7, upper contacts of RLS—F1, conductor 15, relay F1, and conductor C1. Relay F1 causes the current to be supplied to the motor 60 in a manner to cause forward rotation thereof. As soon as the motor starts in a forward direction, the rotation switch contacts RSF are closed, energizing CR4. Closure of contacts CR4 connects conductor C3 to conductor 13, and, through contacts CRF1 and conductor 14, establishes a holding circuit for relay CRF1. The motor thus continues rotating forwardly until the forward limit switch RLS—F1 is opened, thereby opening its contacts between conductors 7 and 15, whereupon the supply of current to the motor 60 is interrupted by deenergization of relay F1. It will be noted that upon energization of CR3, conductors 11 and 12 are connected by the CR3 contacts so that when the forward push button 68 is released and CR1 deenergized, the holding circuit for relay F1 will remain established.

When RLS—F1 is operated, its lower contacts between conductors 25 and 16 are closed, thereby establishing a circuit through CR2. The consequent energization of CR2 results in the energization of CRR1 through the following circuit: conductor C3, contacts CR2, conductor 17, relay CRR1, and conductor C1. Energization of CRR1 through closure of its contacts results in the energization of R1 to cause the application of a plugging torque to the motor 60, this being accomplished through the following circuit: conductor C3, contacts CR2, conductor 17, contacts CRR1, conductor 4, contacts CRR1, conductor 3, contacts CR2, conductor 2, push button switch 68, conductor 1, limit switch RLS—R1, conductor 18, and relay R1 of conductor C1. As soon as the motor has been stopped and commences reverse rotation, the rotation switch contacts RSR are closed, thereby energizing CR5. Energization of CR5 results in locking CR—R1 in energized condition until reverse rotation stops, through the following circuit: from conductor C3, contacts CR5, conductor 4, contacts CRR1, conductor 17, and relay CRR1, to conductor C1. The motor will therefore run in reverse direction until limit switch RLS—R1 is opened, thereby deenergizing relay R1 and interrupting the supply of current to the motor 60.

When relay R1 is deenergized, its contacts between conductors 10 and 7 are closed, and this results in energization of relay F1 through the following circuit: conductor C3, contacts CR5, conductor 4, contacts CRR1, conductor 8, contacts CR2, conductor 9, contacts CR5, conductor 10, contacts R1, conductor 7, upper contacts of RLS—F1, conductor 15, relay F1, to conductor C1. Energization of relay F1 results in the application of power to the motor 60 to apply a forward torque thereto, thus bringing the motor to rest and starting it in a forward direction. Upon initial forward rotation of the motor, the rotary switch contacts RSR are opened, thereby deenergizing relay CR5, and immediately thereafter closing rotation switch contacts RSF to energize CR4. When CR5 is deenergized, it opens its contacts between conductors 9 and 10, breaking the energizing circuit for relay F1, and thus cutting off the supply of power to the motor 60. The motor therefore coasts forward to rest, completing an automatic cycle.

*Operation*

The details of the operation of the machine have been set forth above in connection with the description of the control circuits. It is therefore necessary at this time merely to give a résumé of the general principles of the operation of the machine.

By means of the selector push button switch 72, the controls of the machine may be conditioned either for independent push button control or for automatic cycling. When the selector switch 72 is in position for independent control, the operator is enabled to jog the machine forward or reverse at any point in its travel between the limits set by the cams 174 and 180, which operate the limit switches RLS—RI and RLS—FI. Such flexibility of control is desirable in setting up the machine. Each time the spindle driving motor is stopped, whether it has been rotating in a forward or reverse direction, current is supplied to the motor in a manner to apply a braking or plugging torque thereto, thus overcoming the difficulties inherent in the variable coasting of the motor to a stop. This application of electromagnetically applying reverse torque to the motor in order to stop it will operate in every case except in the event of power failure. Under the latter unusual condition, the motor will merely coast to a stop.

If for any reason either of the rotary limit switches RLS—FI, RLS—RI, should fail to operate properly, the clutch release mechanism will be tripped by the cam 176, or the cam 178, and the spindles will come to rest quickly while the motor 60 may coast freely to a stop. After the clutch 92, 94 has been disengaged, it is necessary for the operator to reset the clutch manually. The fact that it requires some effort upon the part of the operator to reset the clutch will usually induce the operator to see that the fault which caused the clutch disengagement is promptly corrected. The resetting of the clutch requires that the operator apply a crank to the end of the shaft 202 and rotate the spindles back to operative position, and then effect re-engagement of the clutch and repositioning of the clutch latching mechanism.

From the foregoing, it will appear that the invention provides a simple and effective means for positively preventing over-travel of the spindles in either direction, and thus affords adequate protection against damage to work and tools, which might otherwise result from such over-travel.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In a machine tool for performing tapping operations, the combination of a driving motor, a tap carrying spindle, gearing connecting said motor to said spindle, said gearing including a clutch mechanism for severing the driving connection between said motor and said spindle, a limit switch operable to cause reversal of the direction of rotation of said motor upon completion of a predetermined number of revolutions of said spindle in a forward direction, a second limit switch operable to stop the operation of said motor after said spindle has been rotated in a reverse direction through said predetermined number of revolutions, and means to operate said clutch mechanism to sever the driving connection between said motor and said spindle in the event of substantial over-travel of said spindle due to failure of either of said limit switches to operate promptly to reverse or stop the operation of said motor.

2. In a machine tool for performing tapping operations, the combination of a driving motor, a tap carrying spindle, gearing connecting said motor to said spindle, said gearing including a clutch mechanism for severing the driving connection between said motor and said spindle, a control circuit including limit switch means operable to cause reversal of the direction of rotation of said motor upon completion of a predetermined number of revolutions of said spindle in a forward direction and after said spindle has been rotated in a reverse direction through said predetermined number of revolutions, and means to cause disengagement of said clutch mechanism upon substantial over-travel of said spindle.

3. In a machine tool for performing tapping operations, the combination of a driving motor, a tap carrying spindle, a gear train including a clutch forming a driving connection between said motor and said spindle, electrical means for controlling the application of power to said motor, said means including two limit switches, a cam plate, means for driving said cam plate with said spindle, a plurality of cams adjustably secured to said cam plate for respectively operating said limit switches, means for operating said clutch to cause disengagement thereof, and a pair of cams adjustably secured to said cam plate and arranged to operate said clutch disengaging means upon failure of either of said limit switches to stop the operation of the motor when such limit switch is operatively engaged by its associated cam.

4. In a machine tool for performing tapping operations, the combination of a driving motor, a tap carrying spindle, a gear train including a clutch forming a driving connection between said motor and said spindle, electrical means for controlling the application of power to said motor, said means including a limit switch, a cam plate, means for driving said cam plate with said spindle, a cam adjustably secured to said cam plate for operating said limit switch, means for operating said clutch to cause disengagement thereof, and a cam adjustably secured to said cam plate and arranged to operate said clutch disengaging means upon failure of said limit switch to stop the operation of the motor when said limit switch is operatively engaged by said cam.

5. In a machine tool for performing tapping operations, the combination of a driving motor, a tap carrying spindle, a gear train including a clutch forming a driving connection between said motor and said spindle, electrical means for controlling the application of power to said motor, said means including a limit switch, a cam for operating said limit switch, means for driving said cam with said spindle, latching means holding said clutch engaged, and means for tripping said latching means to cause disengagement of said clutch upon failure of said limit switch to stop the operation of the motor when said limit switch is operatively engaged by said cam.

6. In a machine tool for performing tapping operations, the combination of a driving motor, a tap carrying spindle, a positive mechanical clutch and gearing forming a driving connection between said motor and said spindle, cam means geared to said spindle, limit switches respectively operable by said cam means at the ends of the forward and reverse rotation of said spindle, control circuits rendered effective by the operation of said limit switches to cause application of power to said motor in a manner to provide a braking torque thereto to cause the motor rapidly to come to rest and to commence rotation in the opposite direction, and a rotation switch mechanism responsive to the direction of rotation of said motor to interrupt the supply of braking torque current to said motor promptly after it has changed its direction of rotation.

7. In a machine tool for performing tapping operations, the combination of a driving motor, a tap carrying spindle, a positive mechanical clutch and gearing forming a driving connection between said motor and said spindle, cam means geared to said spindle, limit switches respectively operable by said cam means at the ends of the forward and reverse rotation of said spindle, control circuits rendered effective by the operation of said limit switches to cause application of power to said motor in a manner to provide a braking torque thereto to cause the motor rapidly to come to rest and to commence rotation in the opposite direction, a rotation switch mechanism responsive to the direction of rotation of said motor to interrupt the supply of braking torque current to said motor promptly after it has changed its direction of rotation, and means to disengage said clutch upon failure of said motor to come to rest promptly after the operative engagement of said cam means and one of said limit switches.

8. In a machine tool for performing tapping operations, the combination of a driving motor, a tap carrying spindle, a gear train including a clutch forming a driving connection between said motor and said spindle, electrical means for controlling the application of power to said motor, said means including a limit switch, a cam for operating said limit switch, means for driving said cam with said spindle, latching means holding said clutch engaged, means for tripping said latching means to cause disengagement of said clutch upon failure of said limit switch to stop the operation of the motor when said limit switch is operatively engaged by said cam, and manually operable means to rotate said spindle to a position in which said clutch latching means may be reset.

9. In a machine tool for performing tapping operations, the combination of a driving motor, a tap carrying spindle including an individual lead screw, a gear train including a clutch forming a driving connection between said motor and said spindle, electrical means for controlling the application of power to said motor, said means including a limit switch, limit switch operating means geared to said spindle, and means geared to said spindle for operating said clutch to cause disengagement thereof, said last named means operating only upon failure of said limit switch to stop the operation of the motor promptly after operation of the limit switch.

10. In a machine tool for performing tapping operations, the combination of a driving motor, a tap carrying spindle, a gear train including a clutch forming a driving connection between said motor and said spindle, electrical means for controlling the application of power to said motor, said means including two limit switches, a cam support, means for moving said cam support at a speed and to an extent proportional to the rotation of said spindle, a plurality of cams adjustably secured to said support for respectively operating said limit switches, means for operating said clutch to cause disengagement thereof, and means adjustably secured to said support and arranged to operate said clutch disengaging means upon failure of either of said limit switches to stop the operation of the motor when such limit switch is operatively engaged by its associated cam.

11. In a machine tool for performing tapping operations, the combination of a driving motor, a tap carrying spindle, gearing connecting said motor to said spindle, said gearing including a clutch mechanism for severing the driving connection between said motor and said spindle, a control circuit including limit switch means operable to stop said motor upon completion of a predetermined number of revolutions of said spindle in a forward direction, and means to cause disengagement of said clutch mechanism upon substantial over-travel of said spindle.

ROBERT A. SCHAFER.